United States Patent [19]

Pollock et al.

[11] Patent Number: 4,964,133
[45] Date of Patent: Oct. 16, 1990

[54] LASERS IN ALKALI HALIDES USING N AND R COLOR-CENTERS

[75] Inventors: Clifford R. Pollock, Alexandria, Va.; Efstratios T. Georgiou; Timothy J. Carrig, both of Ithaca, N.Y.

[73] Assignee: Cornell Research Foundation, Inc., Ithaca, N.Y.

[21] Appl. No.: 338,069

[22] Filed: Apr. 14, 1989

[51] Int. Cl.$^5$ ............................................. H01S 3/16
[52] U.S. Cl. ...................................................... 372/42
[58] Field of Search ................................... 372/42, 39

[56] References Cited

U.S. PATENT DOCUMENTS

| | | | |
|---|---|---|---|
| 3,736,518 | 5/1978 | Anderson et al. | 331/94 |
| 3,970,960 | 7/1976 | Mollenauer | 331/94.5 |
| 3,991,386 | 11/1976 | Bjorklund et al. | 331/94.5 |
| 4,183,795 | 1/1980 | Bloom et al. | 331/94.5 F |
| 4,208,636 | 6/1980 | German | 331/94.5 F |
| 4,255,719 | 3/1981 | Bloom et al. | 331/94.5 F |
| 4,301,426 | 11/1981 | Schneider | 372/42 |
| 4,347,485 | 8/1982 | Esterowitz et al. | 372/42 |
| 4,519,082 | 5/1985 | Schneider | 372/42 |
| 4,638,485 | 1/1987 | Gellermann et al. | 372/42 |
| 4,672,619 | 6/1987 | Luty et al. | 372/42 |

OTHER PUBLICATIONS

Pandey et al, Phys. Rev. B., 4:4598–4600 (1970).
Gorlich et al. Phys. Stat. Sol., 3:1629–1645 (1963).
Collins et al, Applied Physics Letters, 24:403–404 (1974).
Gomes et al, Physical Review B, 30:7194–7201 (1984).
Baev et al, Sov. J. Quantum Electron., 9:51–53 (1979).
Sterk et al, Solid State Communications, 9:1473–1475 (1971).
Khulugurov et al, Sov. Tech. Phys. Lett., 4:595–6 (1978).
Chepurnoi et al, Phys. Stat. Sol. (b), 125 K41 (1984).
Parfianovich et al, Izvestiya Akademii Nauk SSSR. Seriya Fizicheskaya, 45:309–314 (1981).
Khulugurov et al, Opt. Spectrosc, (USSR), 50:A39 (1981).
Gellermann et al, Optics Communications, 39:391–395 (1981).
Fritz et al, Solid State Communications, 3:61–63 (1965).
"A Primer on F–Center Lasers", Electro-Optical Design, Sep. 1978 pp. 26–29.
Pinto et al, Optics Letters, 10:384–386 (1985).
Schneider et al, Optics Letters, 4:390–392 (1979).
Schneider, Optics Letters, 6:157–158 (1981).
Mollenauer et al, Physical Rev. B, 27:5332–5346 (1983).
Mollenauer et al, Phys. Rev. Lett., 45:1095–1098 (1980).
Georgiou et al, (1988) Optics Letters, 13:978–980.
Compton et al, 1964, "Solid State Physics", ed. Seitz et al, Academic Press, NY vol. 16, pp. 121–226 (See pp. 135 and 136).
Schnatterly et al., 1964, Physical Review, 135:A227-A232.
Nosenzo et al, 1970, Phys. Stat. Sol., 38:369–377.
Hattori, 1962, J. Phys. Soc. Japan, 17:1454–1464.
Silsbee, 1965, Phys. Rev., 138:A180–A197.
Rolfe et al, 1977, Phys. Rev. B, 15:3211–3224.
Pick, 1960, Z. Physik, 159:69–76.
Okamoto, 1961, Phys. Rev., 124:1090–1097.
Byron, 1962, Phys. Rev., 125:509–513.
Schneider et al, 1965, Phys. Rev., 140:A1983–A1991.
Schneider et al, 1966, J. Phys. Chem. Solids, 27:805–814.
Schneider et al, 1966, Solid State Communications, 4:91–94.
Schneider et al, 1986, J. Appl. Phys., 59:1086–1091.

Primary Examiner—Léon Scott, Jr.
Attorney, Agent, or Firm—Jones, Tullar & Cooper

[57] ABSTRACT

The laser material of the invention comprises an alkali-halide crystal, with a rocksalt crystallographic structure, containing point defects selected from the group consisting of $F_3$ or R, $F_4$ and $N_2$ color centers. The preferred laser material is based on the neutral "$N_2$" color center defect. The alkali halide can be any alkali halide, for example, lithium, sodium, potassium and rubidium chloride, bromide and fluoride. The preferred alkali halide is potassium chloride. The lasers of the invention comprise a stable near-infrared laser which can be tuned in the case of KCl for example from 1.23 to 1.35 μm, and can be optically pumped at 1.06 μm, for example from a Q-switched Nd:YAG laser. The laser of the invention represent the first reported laser based on $N_2$-center transitions, and appear to be the first stable laser using a charge-neutral color center in pure alkali halide hosts.

19 Claims, 6 Drawing Sheets

LASERS IN ALKALI HALIDES USING N AND R COLOR-CENTERS

This invention was funded at least in part under a contract with the Office of Naval Research ONR N001486K0418; therefore, the Federal Government has certain rights in the invention.

BACKGROUND OF THE INVENTION

Tunable lasers based on color centers in alkali halides have been demonstrated over the spectral range from 0.8 to 4 $\mu$m. [Mollenauer in "Tunable Lasers" ed Mollenauer et al, Springer-Verlag Berlin 1987, Vol. 59, p 227.]

In most alkali halides a pair of N-absorption bands, called the $N_1$ and $N_2$ bands, is observed on the long-wavelength side of the $F_2$ band. The structure of the N-centers responsible for these absorptions has not been conclusively determined, although these centers have been studied for several decades. In previous work it has been suggested that the N-centers are neutral aggregates consisting of three or four F centers [Schnatterly et al, 1964, *Phys. Rev.*, 135:A227; Compton et al, "Solid State Physics" ed Sertz et al, Academic Press. NY 1964, Vol. 16, pp 135-136; Nosenzo et al, 1970, *Phys. Stat. Sol.*, 38:369; Hattori, 1962, *J. Phys. Soc. Japan*, 17:1454]. One model suggests that both bands originate from a trigonal $F_3$(trigonal $F_3$ is also known as R) defect as a result of splitting of energy levels due to the Jahn-Teller effect [Silsbee, 1965, *Phys. Rev.*, 138:A180; Rolfe et al, 1977, *Phys. Rev.*, B15:3211]. Another model attributes the $N_1$ band to the $F_4$-planar and the $N_2$ band to the $F_4$-tetrahedral color center configurations [Pick, 1960, *Z. Physik*, 159:69]. Of these, in the case of the $N_2$ band, the $F_3$ model has received most experimental support [Silsbee, *supra*; Okamoto, 1961, *Phys. Rev.*, 124:1090 (1961): Bron, 1962, *Phys. Rev.*, 125:509; Schneider et al, 1965, *Phys. Rev.*, 140, A1983; Schneider et al, 1966, *J. Phys. Chem. Solids*, 27:805; Schneider, 1966, *Solid State Commun.*, 4:91; Schneider, 1986, *J. Appl. Phys.*, 59:1086]. Much of the ambiguity is a result of evidence that, at least in KCl, other color center absorption bands overlap the $N_1$ and $N_2$ bands; Nosenzo et al, *supra;* Silsbee, *supra;* Rolfe et al, *supra;* Schneider et al, 1965, *supra;* Schneider et al, 1966, *supra;* Schneider, 1966, *Solid State Commun.*, 4:91; Schneider, *J. Appl. Phys.*, 59:1086.

DESCRIPTION OF THE INVENTION

This invention relates to alkali halide laser materials and methods of preparing such lasers. The laser material of the invention comprises an alkali-halide crystal, with a rocksalt crystallographic structure, containing point defects selected from the group consisting of $F_3$ or R, $F_4$ and $N_2$ color centers. The preferred laser material is based on the neutral "$N_2$" color center defect. The alkali halide can be any alkali halide, for example, lithium, sodium, potassium and rubidium chloride, bromide and fluoride. The preferred alkali halide is a chloride, most preferably potassium chloride.

The lasers of the invention comprise a stable near-infrared laser which can be tuned, in the case of KCl for example from 1.23 to 1.35 $\mu$m, and can be optically pumped at 1.06 $\mu$m, for example from a Q-switched Nd:YAG laser.

The lasers of the invention represent the first reported laser based on $N_2$-center transitions, and appear to be the first stable laser using a charge-neutral color center in pure alkali halide hosts.

The starting crystals used in the present invention can be grown by any method which assures optical quality. The presently preferred method is the Kyropoulos technique. Preferably the starting material is pure KCl. Although no impurity in the host crystal is necessary for the laser-active center formation, most common impurities typically found in alkali halides, such as other alkalis, do not inhibit the formation of the desired centers.

In the process of the invention, the starting crystals are colored to produce a high initial concentration of F-centers and then, especially in the case of additive coloring, preferably quenched in a controlled manner, e.g. rapidly quenched to about room temperature to prevent or retard colloid formation. The coloring process can be any coloring technique known useful in the art, for example electrolytic, radiation damage or additive coloring. Additive coloring is the presently preferred method. Preferably the F-center concentration in the colored crystal is uniformly distributed without significant colloid formation and is at least about $10^{15}$ and preferably at least about $10^{16}$ centers cm$^3$.

The resulting crystal is then illuminated with light in approximately the spectral region of the F-center absorption band, preferably the F-center absorption band or more preferably at slightly longer wavelengths (in the case of KCl the F-center band is 500–600 nm) for example with KCl from about 500 to about 800 nm until the $N_2$ or R center concentration is significantly increased, to provide of crystal which lases by $N_2$ or R center stimulation. The illumination is conducted at a temperature where vacancy mobility is activated and which allows controlled but reasonably rapid aggregation rates, preferably between about 250 K and 300 K, most preferably about 260K.

Apparatus adapted to obtain laser action from a color center material are generally known in the art. The preferred apparatus is an apparatus which has means for exposing the crystals of the invention to light in the absorption bands of the R and/or $N_2$ centers to produce population inversion in the energy configuration of the crystal, and an optical cavity in which the crystal is located, which cavity is capable of resonating at the wavelengths of the fluorescent emission band of $N_2$ or R centers, and is suitably designed to efficiently cause the stimulated emission of coherent radiation from the color center material.

Preferably the optical cavity has a tight beam waist at the location of the crystal, and has a colimated arm to allow for the placement of tuning elements in the cavity.

In one embodiment, the optical cavity has a two mirror and two lens configuration with the laser crystal located at the beam waist of the cavity.

The $N_2$- and/or R- color center lasers of the invention can be pumped in a number of ways, for example using a pulsed laser which can be a Q switched laser. A preferred pulsed laser, especially for KCl, is a 1.06 $\mu$m Nd:YAG laser, preferably with a pulse duration between about 100 and 1,000 nsec.

EXAMPLE

Figure 1:
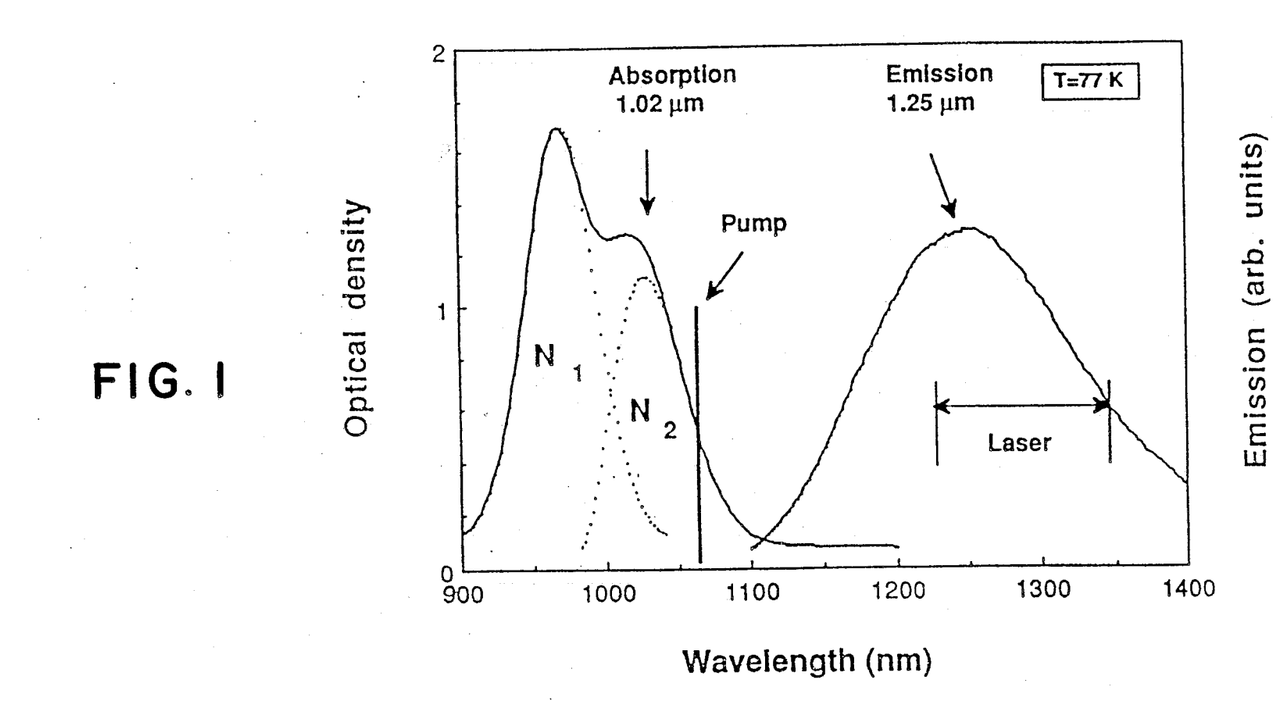
FIG. 1. N-absorption bands and $N_2$-emission band at 77K in a 2.5 mm thick, additively colored, pure KCl crystal. The area under the $N_2$ absorption curve indicates a density of approximately $10^{16}$ $N_2$ centers/cm$^3$. Also indicated are the 1.06 $\mu$m Nd:YAG laser pump line and the tuning region of the $N_2$-color center laser.

As shown in FIG. 1, the $N_1$ and $N_2$ color center absorption bands in KCl peak at 0.97 and 1.02 $\mu$m, respectively. The $N_2$ band conveniently overlaps the 1.06 $\mu$m line of the Nd:YAG laser which was, therefore, used for all fluorescence and laser studies. The $N_2$ emission band peaks at 1.25 $\mu$m.

The pure KCl crystals used in these experiments were obtained from boules grown at the Crystal Growth Facility at Cornell University using the Kyropoulos technique. To ensure that the laser-active center is not associated with any impurity, boules grown from different stocks of pure KCl material were tried. Additionally, UV spectra were taken to verify the absence of oxygen impurities. It was found that such centers can also be formed in doped crystals. For example, the process that is described below produced the desired centers in crystals doped with either Li or OH.

Crystals, approximately 3 mm thick, were additively colored in potassium vapor in a small, hermetically sealed, stainless-steel bomb for 2 hours at 600° C. Bomb coloration was preferred over heat-pipe coloration because higher vapor pressure (~140 Torr) was more easily attained. This higher pressure resulted in a larger initial F-center density in the colored crystals and, subsequently, a larger $N_2$-center population after the processing steps. (However, crystals colored in a heat-pipe at 50 Torr vapor pressure were also suitable as laser media). Following coloration the crystals were rapidly quenched to room temperature by immersing the bomb in a cooling fluid. Fast quenching was essential to prevent the formation of colloidal F-center aggregates, which reduce the crystal optical transmission. The colored crystals were then polished to a thickness of 2.5 mm, cooled to approximately 260 K under vacuum, and exposed for several hours to F-band light (500–600 nm), obtained from the green lines of a 100 W Hg arc lamp using GG-495 (long-pass) and KG-3 (heat absorbing) Schott filters. Efficient photo-aggregation was also possible using the 632.8 nm line of a 5mW He-Ne laser or broadband red light (640–680 nm) at the same temperature range and for comparably long time periods. This photo aggregation process is thought to cause color centers to become mobile and combine to create higher aggregates, among them N-centers and R centers. Crystal exposure to aggregating light at these temperatures was continued until the optical density of the $N_2$-band at the 1.06 $\mu$m wavelength was about 0.5 (measured at T=77 K). Temperature control was important; room temperature photo-aggregation led to the formation of a long-wavelength shoulder absorption on the $N_2$ band that created loss for the laser emission, while temperatures much below 260K simply slowed the aggregation process, requiring impractically long photo-aggregation times (>15 hours). Wavelength control was also important; blue lines from the Hg lamp dramatically enhanced the photo-aggregation rate, but led to a lower $N_2$ to $N_1$ absorbance ratio and resulted in crystals with reduced performance (as laser media) compared to those with a smaller $N_1$ band. In all the above steps, crystal handling, polishing, etc., was performed under regular room light, although care was taken to minimize the total exposure. Variations in the above procedures, even in the steps noted as critical or preferred, resulted in less satisfactory laser performance of the resulting crystals, but in general always yielded laser-active material.

Using 30-nsec, pulsed excitation, the radiative lifetime of the $N_2$-center fluorescence was measured to be 210 (+ 20) nsec at 77K. This lifetime was observed to decrease at temperatures above 120 K, indicating possible non-radiative transitions at elevated temperatures.

Figure 2:
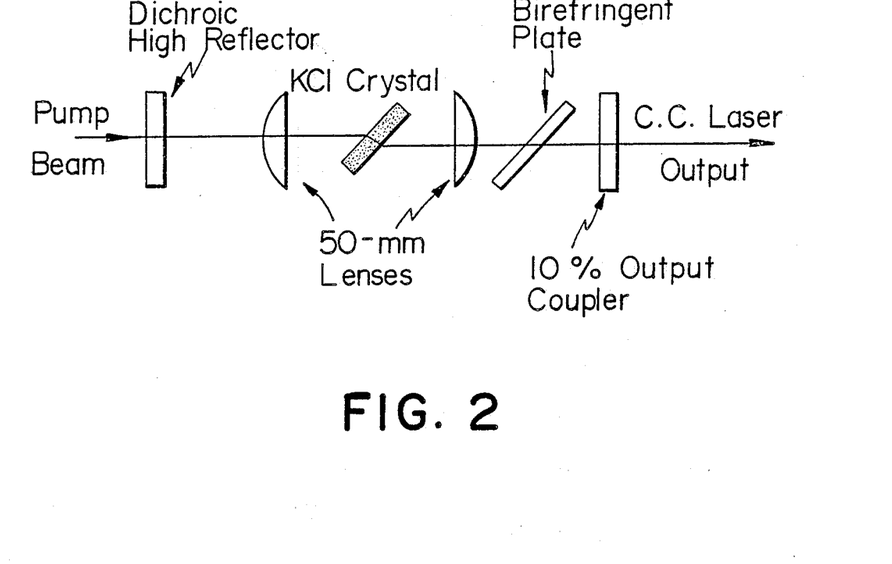
FIG. 2. The $N_2$ color center laser configuration. The crystal is mounted on a cold finger enclosed in a vacuum dewar (not shown).

For laser operation the crystal was clamped at Brewster's angle onto an indium-clad copper cold-finger attached to a liquid-nitrogen dewar and cooled to 77 K. The 1-m long laser cavity (FIG. 2) consisted of a linear symmetrical arrangement of two 50-mm lenses and two plane mirrors and was designed to produce a 30 $\mu$m beam radius at the location of the crystal. The lenses were antireflection coated at 1.27 $\mu$m, while one mirror was coated for high reflectivity and the other for 10% output coupling at 1.27 $\mu$m. A collinear, Q-switched, 1.06 $\mu$m Nd:YAG laser was used to pump the crystal. The pump laser was operated at a repetition rate of 10 KHz and produced pulses of 500-nsec duration. A weak (f=1m) lens was used to mode-match the pump and color-center beams. To separate the polarized color-center laser output beam from the 1.06 $\mu$m pump, a 1-cm thick silicon filter was placed at Brewster's angle after the output coupler.

Figure 3:
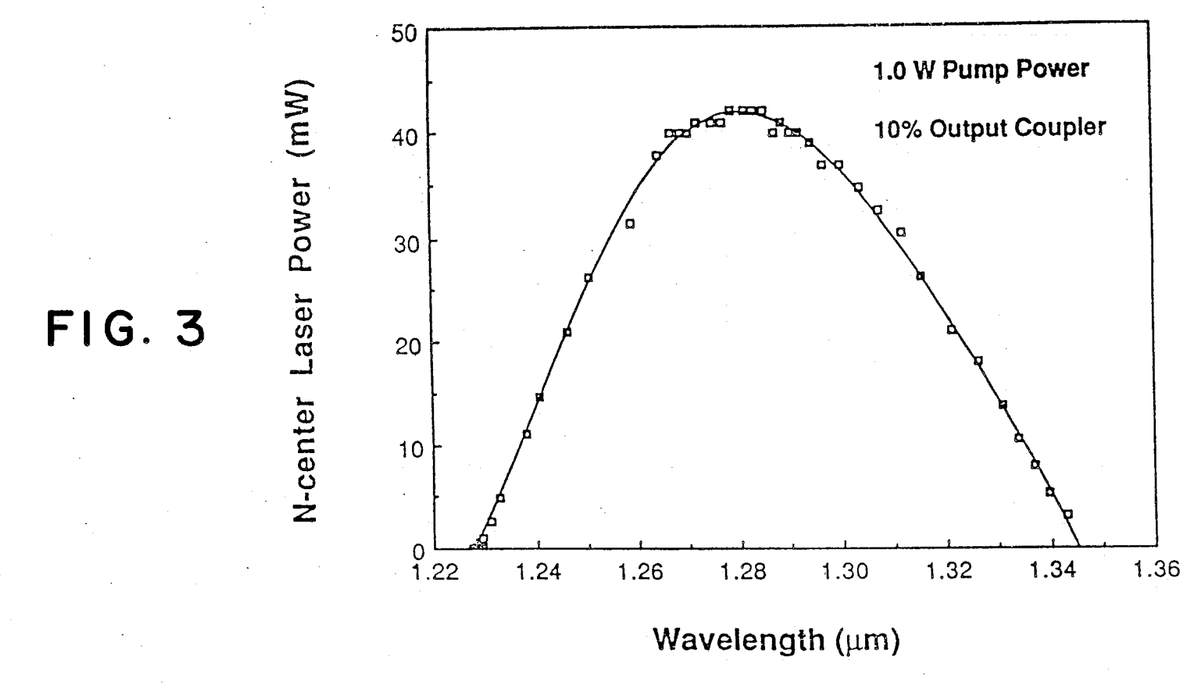
FIG. 3. Power-tuning curve for the KCl $N_2$-center laser at 77 K. Output power was measured with a thermopile detector.

Using a combination of 1-mm and 2-mm thick sapphire birefringent plates as a tuning element, lasing was obtained from approximately 1.23 to 1.35 $\mu$m, as shown in FIG. 3, with 42 mW average power at the peak of the tuning curve (1.28 $\mu$m). Alternative use of a quartz prism as the tuning element gave similar results. The color-center laser pulses followed the pump pulse time profile over the 200- to 700- nsec range that the Q-switched pump laser could be varied.

Figure 4:
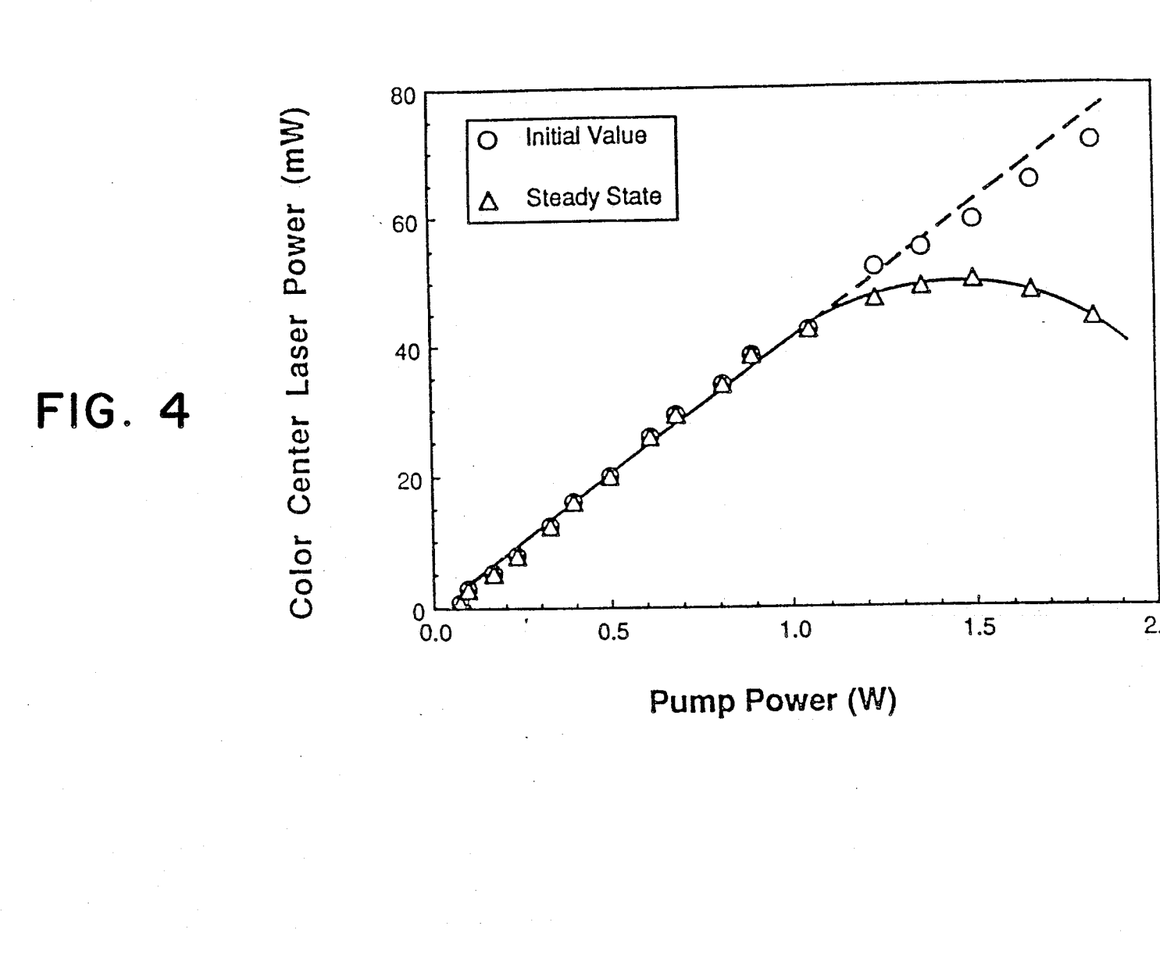
FIG. 4. Output power of a KCl $N_2$-center laser as a function of the pump beam power. Circles represent power values obtained momentarily when starting-up the color-center laser. Triangles represent steady-state values obtained after several sec of operation.

The average output power of the color center laser varied linearly with the pump power and had a slope efficiency of approximately 4% for pump powers up to about 1 W (FIG. 4). At higher pump powers the color center laser output dropped from an initial value that follows the 4% slope to a lower steady-state value. The time required to reach the steady-state value depended on the pump intensity, but was on the order of several seconds. Eventually, for pump powers above 1.5 W, the steady-state laser output became a decreasing function of the input power. This effect was fully reversible for the range of pump powers shown in FIG. 4. However, for much higher average pump power levels (5 W or more) permanent spectral changes and crystal surface damage occurred at the pumped crystal spot and lasing ceased permanently.

Figure 5:
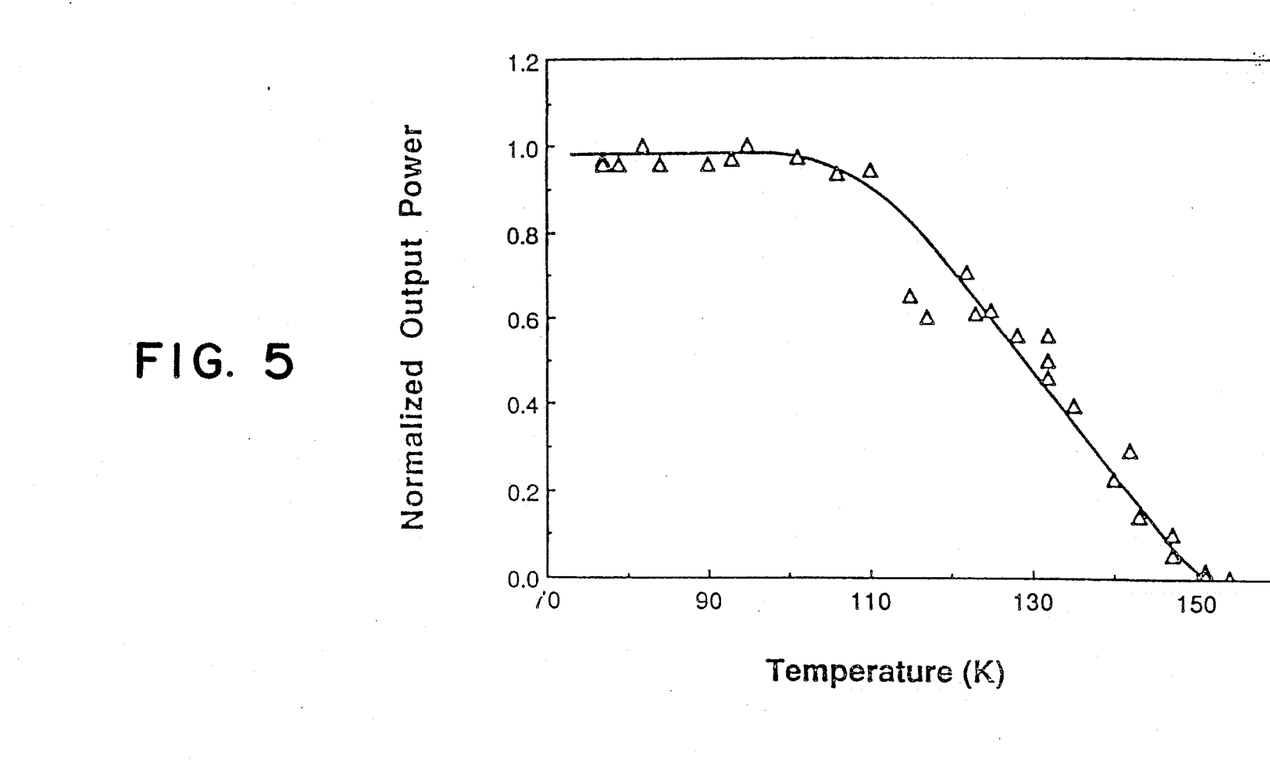
FIG. 5. Normalized output power of the KCl $N_2$-center laser as a function of temperature. Average pump power was kept low (150 mW) to avoid appreciable heating of the crystal.

FIG. 5 illustrates that the power of the $N_2$ color center laser as a function of temperature starts decreasing rapidly above 110K, eventually reaching threshold at approximately 150K. The exact temperatures depend on the pump power level and the corresponding heat load on the crystal.

The color-center laser displayed no observable power fading over periods of several weeks of day-to-day operation at 77K for any pump beam polarization. This suggests that the laser-active centers do not suffer reorientation of the dipole moments or undergo a random walk in the lattice when optically excited at this temperature.

Crystals can be stored at room temperature in the dark without any apparent degradation in future laser performance. For example, after coloration crystals have been stored for several months, and after the photo-aggregation step crystals have been stored for several weeks before being successfully used in a laser. Additionally, laser crystals that were warmed up, stored at room temperature in the dark for over a week, and re-used in the laser without any reprocessing, yielded the same output power as in their initial use. Presumably these storage times can be extended much longer. In pure KCl this room temperature thermal stability suggests that the $N_2$ laser-active center is a neutral defect.

In summary, it has been demonstrated that $N_2$-centers are laser-active defects, and tunable lasing has been obtained in the spectrally important 1.3 $\mu$m region from neutral $N_2$ color centers in additively colored pure KCl. The laser is conveniently pumped with a Q-switched 1.06 $\mu$m Nd:YAG laser and displays no power fading during operation at 77K.

Figure 6:
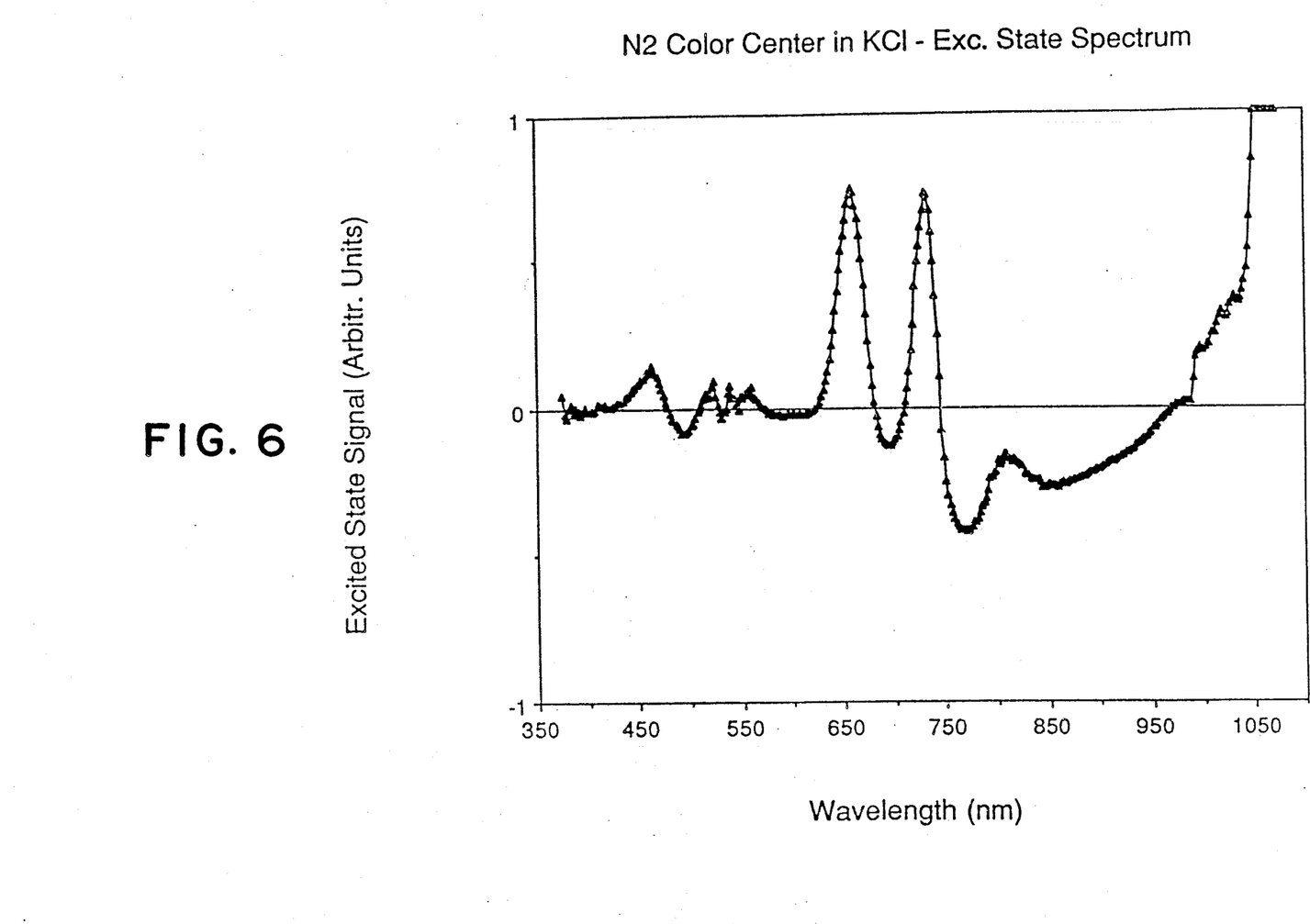
FIG. 6. Excited-state spectrum of the $N_2$ centers in pure KCl. Positive signal indicates transitions from the ground state to higher energy levels, while negative signal indicates transitions from the first excited state to higher energy levels. The presence of strong positive peaks coinciding in wavelength with the $R_1$ and $R_2$ bands (656 and 725 nm) indicates that these bands are due to higher energy transitions of the same center responsible for the $N_2$ transition.

Experimental studies in KCl (polarization measurements, fluorescence spectra, excitation spectra, band growth curves, excited state spectroscopy) agree with the $F_3$ model for the $N_2$ center [see also Silsbee, 1965, *Phys. Rev.*, 138:A180; Schneider et al, 1966, *J. Phys. Chem. Solids*, 27:805]. In particular, excited state spectra furnishes strong evidence that the $N_2$ and R transitions in colored KCl correspond to different energy levels of the same defect (FIG. 6). Therefore it is possible to obtain the same lasing action by pumping the strong higher transitions ($R_1$ and $R_2$) of the $F_3$ color center. These absorptions usually lie between the F and $F_2$ absorption bands (in KCl the R absorption bands peak at 656 and 725 nm, while the emission bands are exactly the same as that of the $N_2$ center). This fact together with the relative ease of R and N band formation in alkali halide lattices allows the development of a class of stable, broadly tunable color center lasers. Such lasers offer the added advantage of allowing choice of many pump wavelength options. In crystals with small lattice constant, like NaF, room temperature operation of these lasers appears possible.

We claim:

1. A laser material which comprises an alkali-halide crystal having a rocksalt crystallographic structure with $N_2$ color-center point defects.

2. The laser material of claim 1 wherein said alkali halide is selected from the class consisting of lithium, sodium, potassium, and rubidium chloride, bromide and fluoride.

3. The laser material of claim 1 wherein said alkali halide is selected from sodium chloride, potassium chloride, and potassium bromide.

4. The laser material of claim 1 wherein alkali halide is potassium chloride.

5. A method of generating laser-active $N_2$ centers in an alkali halide which comprises the steps:
   a. coloring said crystal to provide F color centers;
   b. illuminating said crystal with light in approximately the spectral region of an F center absorption band at a temperature above about 250° K. until the $N_2$ center concentration is significantly increased.

6. The method as in claim 5 of generating laser-active $N_2$ centers in an alkali halide which comprises the steps:
   a. additively coloring said crystal to provide F color centers;
   b. quenching said crystal to retard colloid formation;
   c. illuminating said crystal with light in approximately the spectral region of the F center absorption band at a temperature above about 250° K. until the $N_2$ center concentration is significantly increased.

7. The method of claim 6 wherein the illuminating is with light at slightly longer wavelengths than the F center absorption band.

8. The method of claim 5 wherein alkali halide is potassium chloride.

9. A method of generating laser-active R centers in an alkali halide which comprises the steps:
   a. coloring said crystal to provide F color centers;
   b. illuminating said crystal with light in approximately the spectral region of an F center absorption band at a temperature above about 250° K. until the R center concentration is significantly increased.

10. The method as in claim 9 of generating laser-active R centers in an alkali halide which comprises the steps:
    a. additively coloring said crystal to provide F color centers;
    b. quenching said crystal to retard colloid formation;
    c. illuminating said crystal with light in approximately the spectral region of the F center absorption band at a temperature above about 250° K. until the R center concentration is significantly increased.

11. The method of claim 9 wherein the illuminating is with light at wavelengths slighly longer than the F center absoption band.

12. A method of generating laser-active $N_2$ and R centers in an alkali halide which comprises the steps:
    a. coloring said crystal;
    b. illuminating said crystal with light in approximately the spectral region of an $R_1$ center absorption band at a temperature above about 250° K. until the N and R center concentration is significantly increased.

13. The method as in claim 12 of generating laser-active $N_2$ and R centers in an alkali halide which comprises the steps:
    a. additively coloring said crystal;
    b. quenching said crystal to retard colloid formation;

c. illuminating said crystal with light in approximately the spectral region of the an $R_1$ center absorption band at a temperature above about 250° K. until the N and R center concentration is significantly increased.

14. The method of claim 13 wherein alkali halide is potassium chloride.

15. The method of claim 13 wherein light is provided by red light.

16. The method of claim 12 wherein the coloring is achieved by electrolytic coloration or radiation damage.

17. In an apparatus for amplifying light by stimulated emission of radiation, the improvement which comprises:

a. laser medium which is the alkali halide crystal having a rocksalt crystallographic structure with $N_2$ color-center point defects
  b. means for exposing said crystal with light in the absorption bands of the $N_2$ center of said crystal to produce a population invention in the energy configuration of said crystal;
  c. an optical cavity, in which said crystal is located, said cavity being capable of resonating at the fluorescence bands of $N_2$ and R centers and thus capable of stimulating the emission of coherent radiation from said color centers;

18. The apparatus of claim 17 further comprising means for maintaining the crystal at about 100° K. or lower.

19. The apparatus of claim 18 wherein said cavity has a two mirror and two lens configuration and said laser medium is located at the beam waist of said cavity.

* * * * *